United States Patent
Sattler

[15] 3,643,989
[45] Feb. 22, 1972

[54] DOWEL FOR EXTRUDED SECTIONS OF PLASTICS MATERIAL

[72] Inventor: Erich Sattler, Wildbad (Bundesrepublik Deutschland), Sommerberg, Germany

[22] Filed: Oct. 29, 1969

[21] Appl. No.: 870,227

[52] U.S. Cl....................287/189.36H, 160/381, 287/54 C
[51] Int. Cl...........................................................F16b 7/16
[58] Field of Search............287/189.36 H, 20.92 E, 20.92 K, 287/54 R, 54 B, 127; 160/381; 52/656

[56] References Cited

UNITED STATES PATENTS

| | | | |
|---|---|---|---|
| 3,269,455 | 8/1966 | Gillotti | 287/189.36 H X |
| 3,272,582 | 9/1966 | Anderson et al. | 287/54 A X |
| 2,149,665 | 3/1939 | Box | 287/54 C UX |
| 2,926,941 | 3/1960 | Thompson | 287/189.36 H X |
| 3,368,836 | 2/1968 | Storlie et al. | 287/189.36 H |

*Primary Examiner*—Reinaldo Machado
*Assistant Examiner*—Wayne L. Shedd
*Attorney*—Polachek, Saulsbury & Hough

[57] ABSTRACT

A dowel adapted to be inserted into an open end of a tubular section of plastics material comprises a prismatic plug consisting of solid plastics material and having side face portions and an inserting end portion, and spring sheet steel means contacting said side face portions and formed with lug means extending away from said inserting end portion at an oblique angle to the longitudinal axis thereof.

1 Claims, 7 Drawing Figures

PATENTED FEB 22 1972　　3,643,989

*INVENTOR.*
ERICH SATTLER

DOWEL FOR EXTRUDED SECTIONS OF PLASTICS MATERIAL

This invention relates to a dowel for extruded sections of plastics material.

It is known that all kinds of hollow sections can be made easily and at low cost from plastics material by extruding.

The use of such extruded sections for many purposes, e.g., the assembling of such sections to form units of furniture and parts thereof, was difficult because the joints between the sections could be formed only by drilling, welding or adhering operations or with the aid of rivets, screws or other parts.

This disadvantage is overcome by the dowel according to the invention, which is simply fitted into the open end of the tube, where it holds itself immovably in position.

The dowel is integral with the parts which are to be secured to the tubular sections, such as stub shafts, hinge pins for flap doors and other doors, hooks, eyes, bearings for rollers, and the like.

Two integral dowels according to the invention may be arranged in aligned positions or at an angle and may be used to advantage to connect two tubular sections.

All these advantages are afforded by the dowel according to the invention by the use of a prismatic plug, which is made of solid plastics material and is contacted at least at one side face by a spring sheet steel member having lugs which extend at an oblique angle generally opposite to the inserting direction. The piece of sheet steel is suitably frictionally inserted below undercuts formed in the prismatic plug and is not secured by other means. This results in a simple and inexpensive manufacture of the dowel.

The drawing shows by way of example and partly in section two embodiments of a dowel according to the invention.

Figure 1:
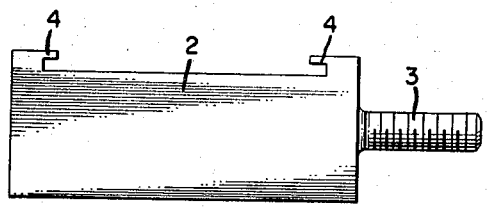
FIG. 1 is a side elevation showing a prismatic body of plastics material which is integral with a stub shaft, the barbed plate being omitted.

The drawing shows a plug 2, which consists of solid plastics material. The plug is integral with the stub shaft 3. The plug 2 made of plastics material is provided with undercuts 4 at the two short edges of a side face. A spring sheet steel member 5 is frictionally fitted below these undercuts. The piece of spring sheet steel 5 is formed with lances 6, which extend obliquely to form barbs. When the parts are inserted into the tubular section 7, the lances 6 are resiliently forced into the sheet steel member 5. Once the dowel has been inserted it cannot be pulled out without destruction of the tubular section because the sharp-edged lances 6 tend to cut into the plastics material of the tube 7 and block any pullout movement.

Figure 5:
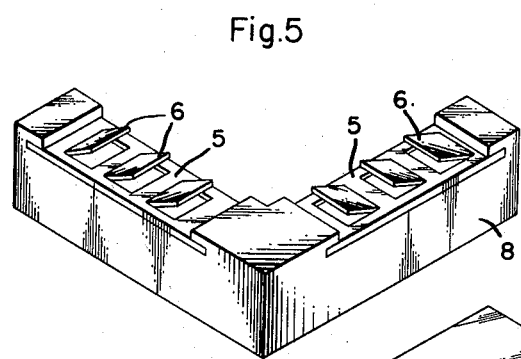
FIG. 5 is a perspective view showing a right-angled connecting dowel.
Figure 6:
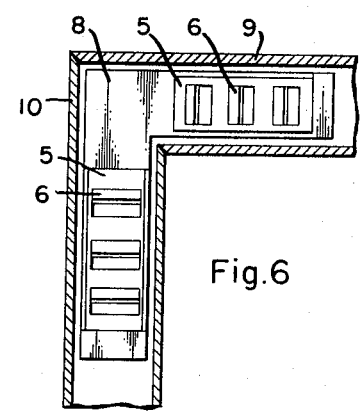
FIG. 6 shows two sections which are assembled with the aid of the corner dowel shown in FIG. 5, with the upper portion of the shell removed.

The two arms of the angle dowel 8 shown in FIG. 5 are pushed into the tubular sections 9 and 10, which are cut at 45° and assembled so that these tubes are inseparably connected by a miter joint.

Figure 2:
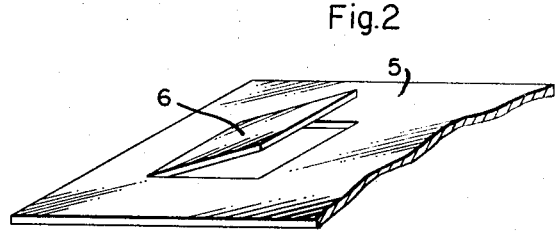
FIG. 2 is a perspective view showing a portion of a barbed plate having a bent up, oblique lance.
Figure 3:
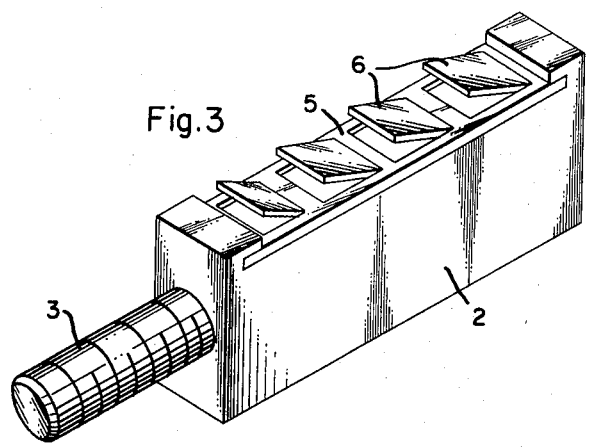
FIG. 3 is a perspective view showing a plug according to FIG. 1 provided with a barbed plate.
Figure 4:
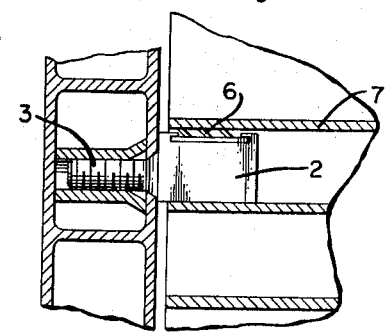
FIG. 4 is a sectional view taken through an end portion of a tubular section, into which a plug as shown in FIGS. 1 and 3 has been inserted, and through the shaft bearing.
Figure 7:
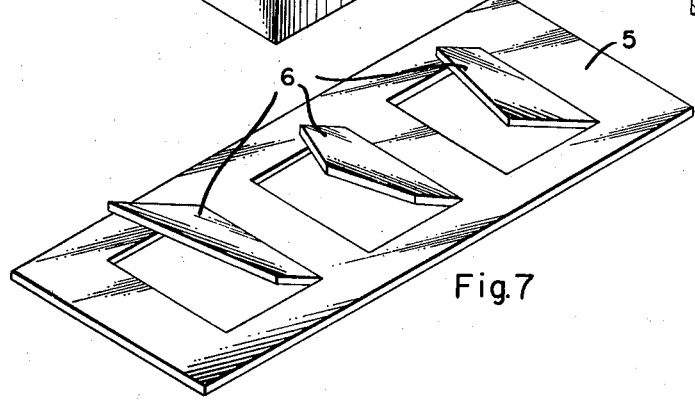
FIG. 7 shows a modification of the barbed plate of FIG. 2.

A dowel provided with a barbed plate as shown in FIG. 2 may sometimes cause thin-walled tubular sections to bulge. This disadvantage is avoided by a barbed plate as shown in FIG. 7.

What is claimed is:

1. A dowel adapted to be inserted into an open end of a tubular section of plastics material and comprising a prismatic plug consisting of solid plastic material and having side face portions and inserting end portions each defining a longitudinal axis, and spring sheet steel means contacting said side face portions and formed with lug means extending away from said inserting end portion at one oblique angle to said longitudinal axis, in which said side face portions are formed with undercuts in which said spring sheet steel means is received and retained in frictional contact therewith, said lug means being a plurality of semicutout portions from said short steel means and being in series, with the series extending along said longitudinal axis, each semicutout portion extending in transverse width less than said sheet steel means' width at the cutout site, with each semicutout having a remaining uncut bridge continuous with said sheet steel means, said side face portion having a shape defining at least two opposite overhanging protuberances, and at least two corresponding opposite edges of said sheet steel means being shaped such that said sheet steel means is lockable flush with said face, in which said plug has two inserting end portions and said lug means comprise first lug means disposed adjacent to and extending away from one of said inserting end portions at an oblique angle to the longitudinal axis defined thereby and second lug means disposed adjacent to and extending away from the other of said inserting end portions at an oblique angle to the longitudinal axis defined thereby, said sheet steel means being a substantially flat elongated strip having a length extendable along said longitudinal axis, and said opposite protuberances being located along said longitudinal axis such that opposite ends of said strip's lengthwise edges are lockable beneath said protuberances, said dowel being adaptable for connecting two tubular sections of plastics material, in which dowel said spring sheet steel means comprise two spring sheet steel members, each of which is formed with one of said first and second lug means, in which said inserting end portions define longitudinal axes extending at an angle to each other, in which said side face portions are formed with undercuts in frictional contact with said spring sheet steel means, in which said plug further comprises a portion spaced from said inserting end portions and integral with a structural part to be connected with the aid of said dowel, and in which said lug means consist of lances which are spaced apart in the longitudinal direction of said plug and have pointed ends, which are offset transversely to said longitudinal direction.

* * * * *